(12) United States Patent
Ono

(10) Patent No.: US 6,254,901 B1
(45) Date of Patent: Jul. 3, 2001

(54) METHODS FOR PRODUCING FERMENTED FOOD FROM SOYMILK REFUSE

(75) Inventor: Haruhiro Ono, Tokyo (JP)

(73) Assignee: Kabushiki Kaisha Mitakado, Tokyo (JP)

( * ) Notice: Subject to any disclaimer, the term of this patent is extended or adjusted under 35 U.S.C. 154(b) by 0 days.

(21) Appl. No.: 09/568,251

(22) Filed: May 10, 2000

(30) Foreign Application Priority Data

May 12, 1999 (JP) .................................................. 11-130753

(51) Int. Cl.⁷ ....................................................... A23L 1/20
(52) U.S. Cl. ................ 426/46; 426/52; 426/634
(58) Field of Search ............................. 426/46, 634, 656, 426/52, 574

(56) References Cited

U.S. PATENT DOCUMENTS

| | | |
|---|---|---|
| 3,718,479 * | 2/1973 | Kanno et al. .............................. 99/17 |
| 3,961,078 * | 6/1976 | Stitt ........................................ 426/41 |
| 4,938,972 * | 7/1990 | Moo-Young et al. .................. 426/31 |
| 5,269,939 * | 12/1993 | Laurent et al. ....................... 210/705 |

FOREIGN PATENT DOCUMENTS

05003761 * 1/1993 (JP) ................................ A23L/1/20

* cited by examiner

Primary Examiner—Nina Bhat
(74) Attorney, Agent, or Firm—Young & Thompson

(57) ABSTRACT

This invention relates to a method for producing fermented food from soymilk refuse characterized in that a wet or dry soymilk refuse is sterilized or disinfected, inoculated with a microorganism belonging to Neurospora, and subjected to fermentation. According to the invention, fermented food with excellent palatability and high nutritive values, which food is utilized as health food, can be manufactured.

6 Claims, 2 Drawing Sheets

METHODS FOR PRODUCING FERMENTED FOOD FROM SOYMILK REFUSE

FIELD OF THE INVENTION

The present invention relates to a method for producing fermented food from soymilk refuse through fermentation with a microorganism belonging to Neurospora.

BACKGROUND OF THE INVENTION

It is well known that soymilk refuse is rich in dietary fiber and is a food resource with high nutritive values. However, since soymilk refuse has difficulties in food handling because of its rapid deterioration with bacterial growth, its use as a foodstuff has been restricted to only a daily delivery food so that a large amount of the soymilk refuse has been treated as industrial waste so far. Therefore, there has been demand for effective utilization of the soymilk refuse.

In some examples of effective utilization of the soymilk refuse, the soymilk refuse, which has previously been subjected to enzymatic reactions such as lipolysis and proteolysis, has been used as a confectionary stuff, for example, for preparing cookies, and as a cooking stuff for preparing croquette or hamburger, and dry soymilk refuse has been utilized in culture media for mushroom cultivation, in beds for preserving vegetables, and as feed in stock farming. Considering its high drying cost, however, its effective utilization with high value added has to be desired.

On the other hand, fermented food of soymilk refuse seems to be hopeful for human health because it contains dietary fiber and chitin-chitosan which is derived from the mold used; the former controlling intestinal functions and lowering blood cholesterol levels, the latter having physiological activities. Among the fermented food of soymilk refuse hitherto prepared, there is one example made by fermentation with a mold, Tempeh. But the food has not come into Japanese market because it does not satisfy Japanese palatability.

Under the above described circumstances, i.e. in which the soymilk refuse has not effectively been used so far regardless of its outstanding characteristic suitable for excellent foodstuff as health food, and in which the conventional products made from the soymilk refuse has not satisfied Japanese palatability, whereby the soymilk refuse has had to be treated as industrial waste, an object of the invention is to provide a method for producing highly nutritive fermented food with excellent palatability from the soymilk refuse, which food will come to be popular in the market as health food.

SUMMARY OF THE INVENTION

The present invention is directed to a method for producing fermented food from soymilk refuse characterized in that the method comprises disinfecting or sterilizing a wet or dry soymilk refuse, then inoculating a microorganism belonging to Neurospora onto the resulting soymilk refuse followed by subjecting to fermentation.

In one embodiment of the invention, the dry soymilk refuse in which water content has been adjusted to 60–70% is used as the starting material.

In another embodiment of the invention, the microorganism belonging to Neurospora to be used is *Neurospora sitophila*, a mold for producing Ontjom.

In yet another embodiment of the invention, the wet or dry soymilk refuse is disinfected or sterilized, inoculated with *Neurospora sitophila*, then subjected to fermentation process at 25–30° C. for 48–72 hours.

In further embodiment of the invention, the wet soymilk refuse or the dry soymilk refuse in which water content has been adjusted to 60–70% is sterilized with superheated steam for 10 minutes, inoculated with *Neurospora sitophila*, and subjected to fermentation at 25–30° C. for 48–72 hours.

DETAILED DESCRIPTION OF THE INVENTION

This invention relates to a method for producing fermented food from soymilk refuse, characterized in that a wet or dry soymilk refuse is sterilized or disinfected, inoculated with a microorganism belonging to Neurospora, then subjected to fermentation process.

Figure 1:
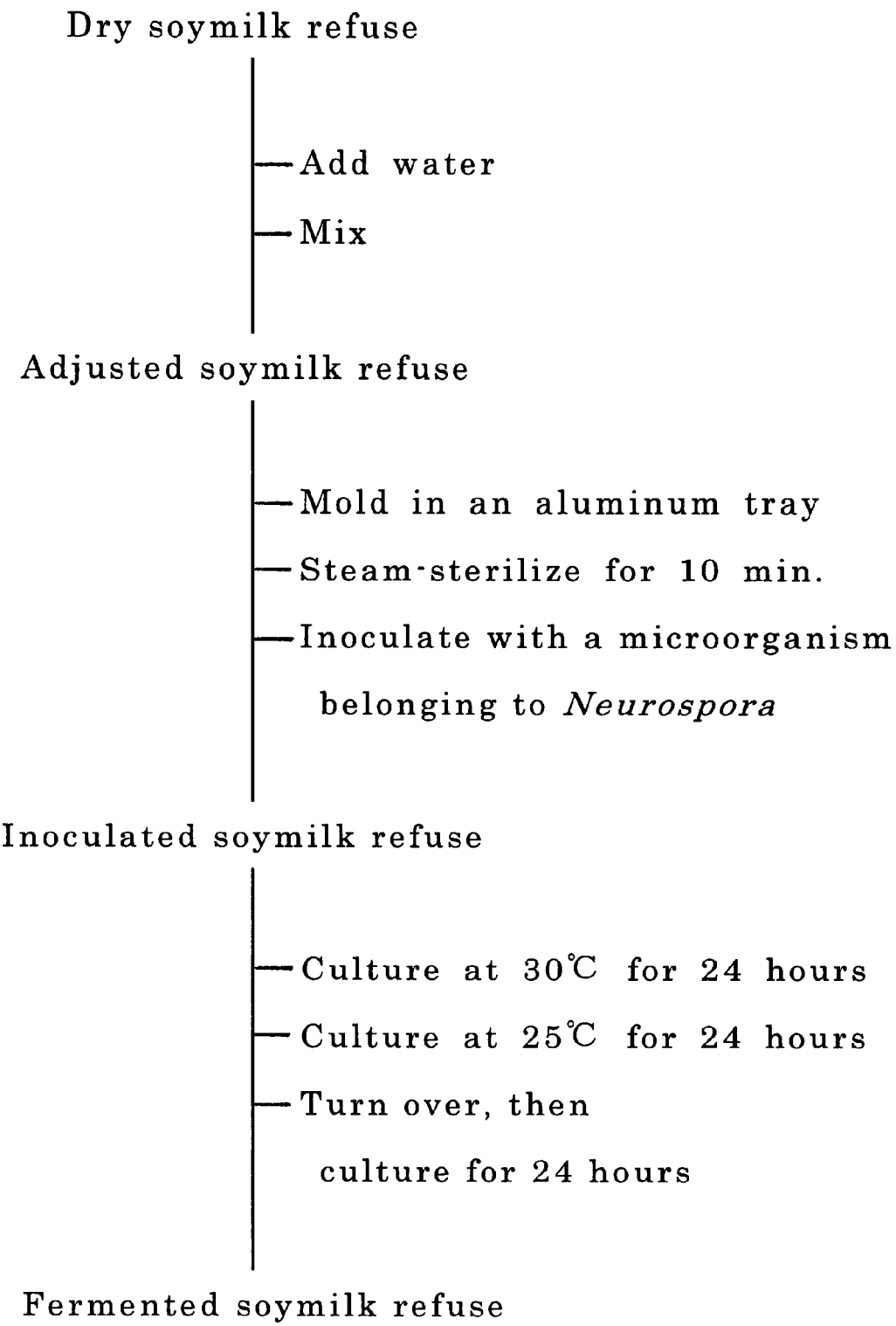
FIG. 1 shows the flow chart of a method according to the invention for producing fermented food from soymilk refuse.
Figure 2:
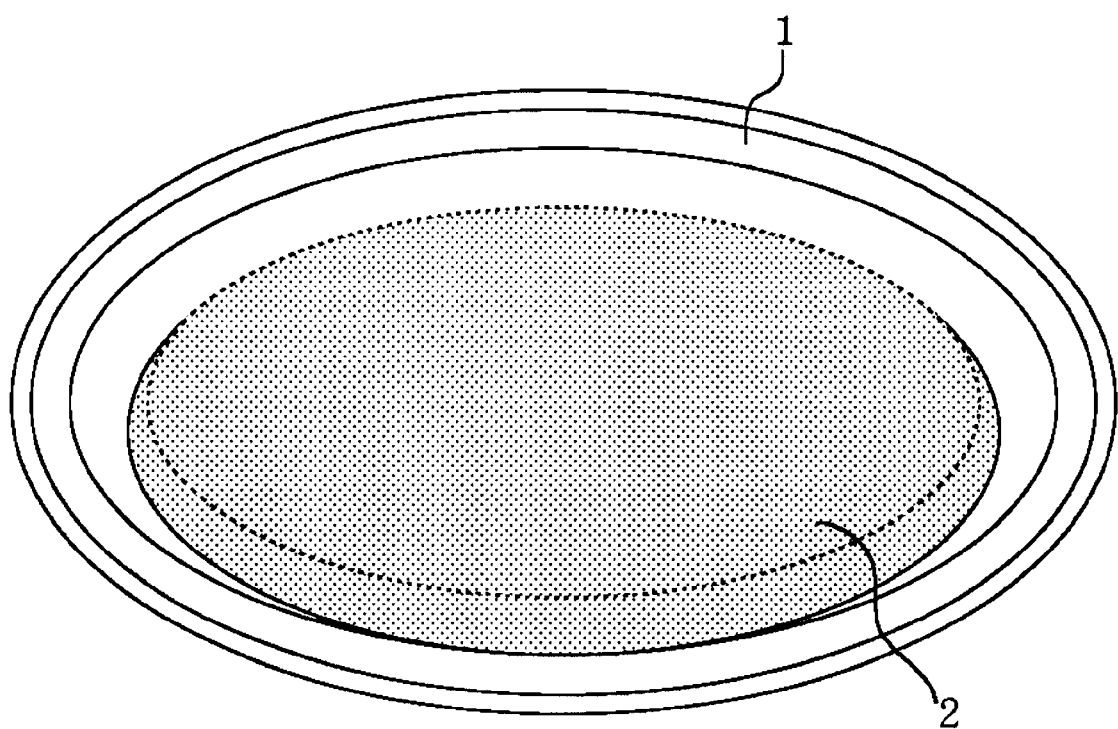
FIG. 2 shows the appearance of a soymilk refuse cultured in an aluminum tray, where 1 is an aluminum tray and 2 is a fermented soymilk refuse.

Prior to carrying out the method of the invention, the following preparations are to be made: *Neurospora sitophila*, a mold for producing Ontjom, is inoculated onto a potato-dextrose agar plate nl, z and then the preculture is conducted at 25° C. until orange-colored spore formation is confirmed. Soymilk refuse with water content of 60–70% is made by addition of water to dry soymilk refuse, and the adjusted soymilk refuse thus obtained is put in an aluminum tray, and mildly pressed so that it is molded into any form having about 1.5 cm thick on the tray, as shown in FIG. 1. Subsequently, the aluminum tray is covered with an aluminum foil and subjected to a sterilization treatment with superheated steam for 10 minutes. After spraying the above mentioned mold spore suspension onto the soymilk refuse, the mold-containing soymilk refuse thus obtained is cultured at 30° C. for 24 hours then at 25° C. for 24 hours, and then the culture is turned over and again cultured for 24 hours, thereby obtaining the cultured soymilk refuse as shown in FIG. 2.

Several experimental results preliminary done for establishing the above method are shown in Tables 1 and 2. Table 1 shows the relationship between water content of soymilk refuse (50–80%) and growing state of *Neurospora sitophila*. The results of Table 1 show that the best water content of soymilk refuse is 60–70% for good growth of *Neurospora sitophila* with spore formation. Thus, the soymilk refuse with a water content of 60–70% was used in the example described above.

TABLE 1

Relationship between a water content of soymilk refuse and a growing state of *Neurospora sitophila*

| | Water content of soymilk refuse (%) | | | |
| --- | --- | --- | --- | --- |
| | 50 | 60 | 70 | 80 |
| Growing state | ++ | +++ | +++ | ++ |

Culture condition: 30° C., 24 hours
+++: Good growth (with spore formation)
++: Normal growth Table 2 shows the results of experiments carried out to find influence of culture temperatures on growing state of *Neurospora sitophila*. In the experiments, growing state of *Neurospora sitophila* was observed in the following conditions: a culture temperature ranging 15–35° C.; and a culture time ranging 12–72 hours. As shown in Table 2, the good growth of the mold with spore formation was observed at the time point of 72 hours at a temperature above 25° C, and from the time point of 24 hours at the temperature of 30° C.

TABLE 2

Influence of culture temperatures on growing state of *Neurospora sitophila*

| Temperature(° C.) | Culture time (hours) | | | |
|---|---|---|---|---|
| | 12 | 24 | 48 | 72 |
| 15 | − | − | − | − |
| 20 | − | − | + | ++ |
| 25 | − | + | ++ | +++ (+) |
| 30 | ++ | +++ (+) | +++ (+) | +++ (+) |
| 35 | +++ (−) | +++ (−) | +++ (−) | +++ (−) |

+++: Good growth (Existence of spore formation)
++: Normal growth
+: Less growth
−: No growth
(+): Spore formation
(−): No spore formation The spore formation in the cultured soymilk refuse is prerequisite for producing perfect products from soymilk refuse. Table 2 shows that the growth of *Neurospora sitophila* is raised as the culture temperature is higher, but the culture at 35° C. gives only its hypha without spore formation. This table also shows that the culture temperature below 25° C. is beside the practically usable culture conditions because of low growth rate of *Neurospora sitophila*, and that the lowest culture temperature needed for spore formation is 25° C. Considering the importance of growth rate in early stage of the culture, however, the suitable temperature for the early stage is 30° C. at which the culture time is as short as 24 hours. The fact that the culture time adopted in the example is 72 hours is due to the culture process comprising culturing the soymilk refuse for 24 hours at 30° C. then for 24 hours at 25° C. and for additional 24 hours after turning over the culture, resulting in formation of hypha and spore on both sides of the culture.

In the fermented food of soymilk refuse prepared in the above example, the content of crude proteins is increased to 125%, and contents of water-soluble dietary fiber and free sugars also increase; these changes are resulted from fermentation with *Neurospora sitophila*, and contribute to high digestability of the fermented food. The product has no bad odor characteristic of soybean, and gives no rough feeling in palatability characteristic of soymilk refuse. When the product is fried or pan-fried, its taste and texture comes to be quite different from that of the original soymilk refuse, giving smooth feeling in palatability and meat-like taste. Considering the characteristic points described above, the product has much potential in use as a vegetable foodstuff with dietary fiber and low calories.

ADVANTAGEOUS EFFECT OF THE INVENTION

According to the present invention, a new foodstuff of soymilk refuse, which foodstuff has smooth palatability and meat-like taste, can be produced from soymilk refuse, most of which has been treated as industrial waste. Further, the efficient method for producing the fermented food according to this invention will be able to accelerate utilization of soymilk refuse, providing its possible use as new health foods.

What is claimed is:

1. A method for producing fermented food from soymilk refuse, characterized in that a wet or dry soymilk refuse is sterilized or disinfected, inoculated with a microorganism belonging to Neurospora, and subjected to fermentation.

2. A method as claimed in claim 1, wherein the dry soymilk refuse in which water content has been adjusted to 60–70% is used.

3. A method as claimed in claim 1, wherein the microorganism belonging to Neurospora is *Neurospora sitophila*, which is a mold for producing Ontjom.

4. A method as claimed in claim 1, characterized in that the wet or dry soymilk refuse is disinfected or sterilized, inoculated with *Neurospora sitophila*, and subjected to fermentation at 25–30° C. for 48–72 hours.

5. A method as claimed in claim 1, characterized in that the wet soymilk refuse or the dry soymilk refuse in which water content has been adjusted to 60–70% is sterilized with superheated steam for 10 minutes, inoculated with *Neurospora sitophila*, and subjected to fermentation at 25–30° C. for 48–72 hours.

6. A method for producing fermented food from soymilk refuse, the method comprising the steps of:

mixing dry soymilk refuse with water so that the mixture has a water content of 60–70%;

sterilizing the mixture with superheated steam;

inoculating the sterilized mixture with a microorganism belonging to Neurospora; and fermenting the inoculated mixture at 30° C. for about 24 hours and then at 25° C. for about 48 hours.

* * * * *